May 18, 1948. O. H. BANKER 2,441,928
AXIALLY ENGAGED SPEED RESPONSIVE CLUTCH
Filed May 28, 1942 3 Sheets-Sheet 3

Inventor:
Oscar H. Banker
By- Stone, Artman & Brown
Att'y.

Patented May 18, 1948

2,441,928

UNITED STATES PATENT OFFICE 2,441,928

AXIALLY ENGAGED SPEED RESPONSIVE CLUTCH

Oscar H. Banker, Evanston, Ill., assignor to New Products Corporation, Chicago, Ill., a corporation of Delaware Application May 28, 1942, Serial No. 444,867

18 Claims. (Cl. 192—105)

1

This invention has to do with a clutch and relates more particularly to one suited for use between the engine and traction wheels of a vehicle, though not limited to this use.

An object of this invention is the provision of an improved speed-responsive clutch employing a novel inertia weight arrangement for closing the clutch when its driving part attains or exceeds a predetermined rotational speed.

A still further object of the invention is the provision of an improved speed responsive clutch structure wherein a spiral spring coaxial with the clutch is operable to exert a comparatively great force opposing initial advancement of the pressure plate for closing the clutch whereby engine warm-up speeds are attainable without closing the clutch, and wherein there is a roller means advanceable under control of means responsive to clutch drive member speed to advance the pressure plate and to attain an overthrow position, after fully advancing said pressure plate, to resist retraction of the plate until the drive member decelerates to a speed substantially less than that required to cause said initial advancement of the pressure plate in engaging the clutch.

A still further object is the provision in a friction clutch of a spiral spring coaxial with the clutch and operable to urge the pressure plate toward its retracted position and to concurrently urge a fulcrum member for actuating levers of the clutch in the direction opposite to that in which it is reacted upon by said levers.

A still further object is the provision of a speed responsive clutch operable to prevent initial frictional engagement of drive and drive friction elements below clutch drive member speeds of substantially 1000 R. P. M. and incur at a drive member speed of substantially 1300 R. P. M., a locked-up condition wherein the friction elements are firmly engaged and which condition prevails until the drive member speed decreases to substantially 400 R. P. M.

These and other desirable objects inherent in and encompassed by the invention will be better understood from the ensuing description, together with the annexed drawings, wherein:

Fig. 3 is a fragmentary sectional view taken similarly to Fig. 1 but showing a modified form

2 of spring for delaying the engagement of certain of the clutch plates;

Figures 1, 4:
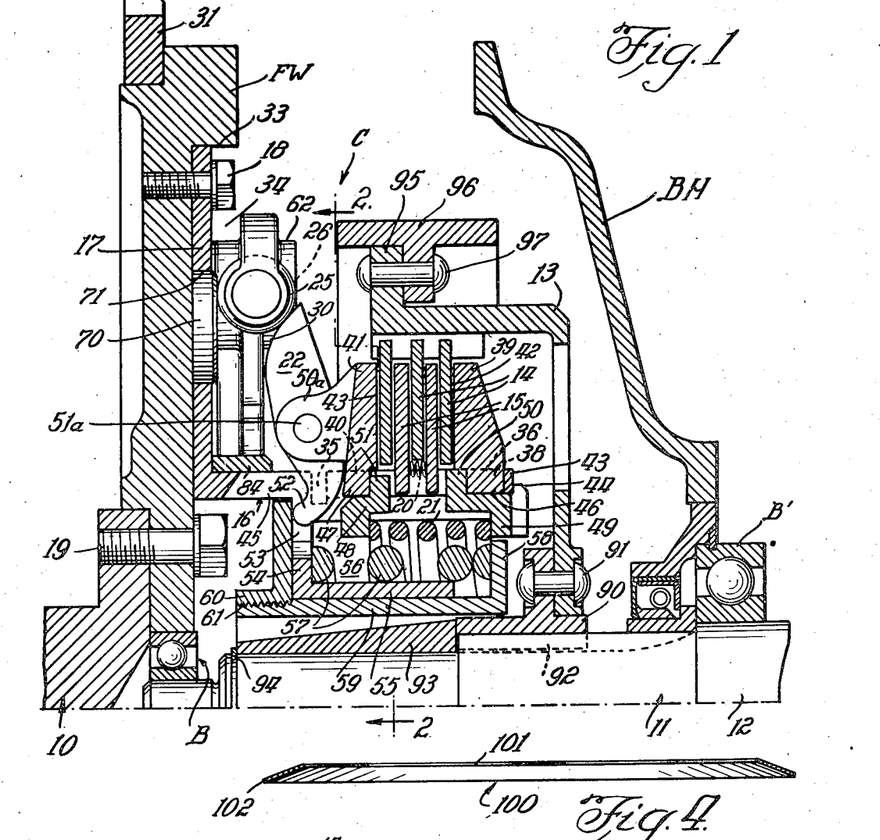
Fig. 1 is a sectional view illustrating the upper half of a clutch constructed according to the principles of the present invention, taken upon a plane extending axially through the clutch.
Fig. 4 is a sectional view taken diametrically through one of the springs shown in Fig. 3.
Figure 2:
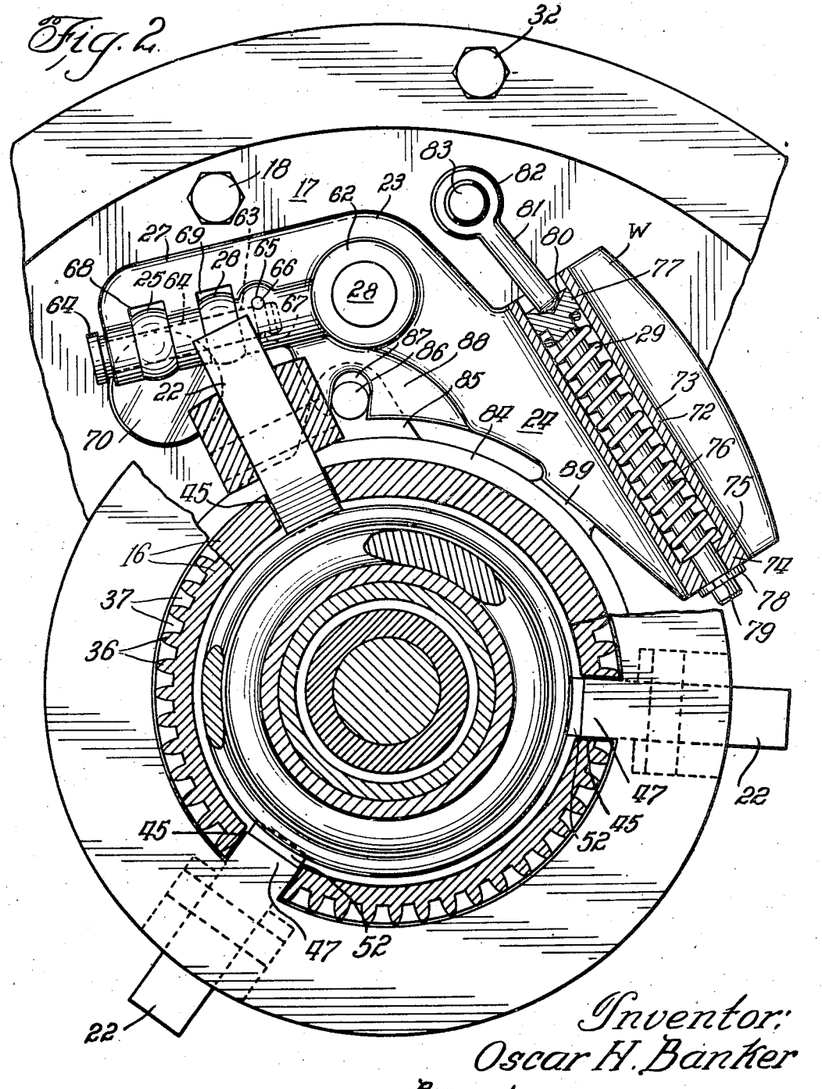
Fig. 2 is a fragmentary sectional view taken substantially upon the line 2—2 of Fig. 1.

Referring first to Figs. 1 and 2 the clutch embodiment generally designated C there shown which constitutes a preferred form of the invention is installed between the crank shaft 10 of an automobile engine and the drive shaft 11 of a change-speed transmission of any suitable type for transmitting the drive to the traction wheels of the associated vehicle (not shown). The forward end of the driven shaft 11, the left end as viewed in Fig. 1, is of reduced diameter and piloted coaxially of and within the crank shaft 10 by means of a ball bearing unit B whereas a back end portion 12 of said shaft 11 is journaled within a ball bearing unit B' which in turn is supported within a section of a bell housing wall BH.

Before describing the parts of the illustrated installation in detail, it will be explained that the transmission drive shaft 11 is driven from a driven drum 13 of the clutch. The drum 13 carries a series of annular plates 14 frictionally engageable with and thus drivable by a plurality of driving clutch plates 15 which are upon and rotative with a driving drum 16 of the clutch. This drum has at its front end, a large disk-like flange 17 secured by means of bolts as 18 for rotation with a flywheel FW which in turn is connected with the engine crank shaft by means of bolts as 19. Normally the drive and driven clutch plates 14 and 15 are held out of frictional engagement by springs 20 and 21, which will be explained more fully hereinafter, but are engageable for effecting a driving connection between the driving and driven drums 16 and 13 by the clockwise rotation of cam levers 22, as one thereof is viewed in Fig. 1. There are three of said levers 22 as can be seen from Fig. 2. Such clockwise rotation of the levers 22 is brought about by centrifugal weight members 23, there being one of said weight members for each of the cam arms 22, which have centrifugal weight portions W upon one arm 24 and which carry rollers 25 and 26 upon a second arm 27; see Fig. 2. The weights 23 are pivotally mounted upon pivot studs 28 anchored in the disk-like flange 17 of the clutch driving drum 16. When the engine crank shaft 10 and hence said clutch driving drum 16 attain a predetermined speed, the centrifugal weight portions W will be thrown outward sufficiently against the force of helical springs 29 contained therein to roll their associated rollers 26 downwardly along the curved profile 30 of their associated cam levers 22 to effect the aforesaid clockwise rotation of said levers.

The parts shown will now be described in greater detail.

There is secured to the outer periphery of the flywheel FW the usual starter ring gear 31 which may be held in place by a plurality of bolts 32 distributed circumferentially about the flywheel and of which one is shown in Fig. 2. A plurality of bolts 18 are for securing the disk-like flange 17 of the driving drum 16 to the rear face of the flywheel. The outer periphery of the flange 17 fits within the cylindrical inner periphery 33 of a recess 34 in the back side of the flywheel, and the bottom of said recess provides a flat surface or face against which the front side of the flange 17 is held by said bolts 18.

When the flange 17 is assembled with the flywheel FW in the just described manner the clutch driving drum 16, which is cylindrical, will be disposed coaxially with the crank shaft 10 and the driven shaft 11. In Fig. 1 there is shown in dotted outline a cross section of a groove 35 which circumscribes the outer periphery of the driving drum 16, and that outer peripheral portion of said driving drum to the rear, to the right as viewed in Fig. 1, of this groove 35 is splined as shown at 36 in Fig. 2. These splines mesh with teeth 37 on the inner periphery of the driving clutch disks 15. Said splines 36 also mesh with splines 38 on the inner periphery of a fixed pressure plate 39 and splines 40 on the inner periphery of an axially movable pressure plate 41. Said pressure plates 39 and 41 are annular members having inner annular friction faces 42 and 43 for frictional engagement with the faces on the clutch driven plates 14 respectively in opposed relation therewith. A snap ring 43 disposed within a groove 44 in the outer periphery of the driving drum 16 prevents axial displacement of the fixed pressure plate 39 backwardly.

Three axial notches 45, each opening outwardly of the back end of the drum 16, are spaced equiangularly about the drum; see Fig. 2. The fixed pressure plate 39 has three bosses 46 projecting inwardly from its inner periphery respectively into said axial notches 45 and the axial movable pressure plate 41 has corresponding bosses 47 respectively projecting into said axial notches. Spring-stop or abutment rings 48 and 49 are disposed within the clutch driving drum 16. Of these rings 48 and 49 the latter has three studs 50 projecting radially outwardly respectively into the drum notches 45 while the former has three studs 51 projected radially outwardly into said notches. The studs 50 abut against the studs 46 on the pressure ring 39 to prevent backward displacement of the spring-stop ring 49 and the studs 51 are abuttable by the studs 47 on the axially movable pressure ring 41 to cause backward displacement of the ring 48 with said pressure ring 41. The helical spring 21 reacts axially at its two ends respectively against the rings 48 and 49 for normally holding these plates axially separated and thus holding the pressure plate 41 in spaced relation with respect to the pressure plate 39 and out of frictional engagement with their associated clutch plates 14 while the clutch is disengaged. Clutch driving plates 15, during clutch disengagement, are held separated and out of frictional engagement with the plate 14 therebetween by a plurality of helical expansion springs 20. Said springs 20 are held in their respective positions within the grooves between the splines 36 by the clutch driven plate 14 in radial alignment therewith and these springs are sufficiently short that when completely expanded during clutch disengagement they will not force the clutch driving plates 15 at the opposite ends thereof into frictional driving relation with the clutch driven plates 14 respectively upon their outer sides.

There are three pairs of ears 50a upon the back face of the axially movable pressure ring 41. These pairs of ears respectively receive the cam levers 22 and carry pivot pins 51a for said levers. Also the pairs of ears 50a are so spaced circumferentially of the pressure plate 41 as to register the spaces respectively therebetween with the driving drum notches 45 whereby fulcrum tips 52 on the radial inner ends of said cam levers project radially inwardly through said notches 45. In Fig. 1, with reference to the notch 45 there shown, it will be seen that said notches have a radial portion 53 projecting radially inwardly of the clutch into an annular web 54 which is integral with the clutch driving drum 16. This web 54 has an integral backwardly directed cylindrical bearing or sleeve-holder 55 which is of smaller diameter than the drum 16 but cooperating therewith in effecting an annular spring chamber 56 for the spring 21 and a much heavier or stronger helical spring 57. Said web 54 serves as a stop for the left end of the spring 57. Said spring 57 constitutes a fulcrum spring, as will be better understood presently. The front end of this spring bears against the back side of the web 54 whereas the back end thereof bears against a spring-stop flange 58 upon a sleeve 59 which is journalled within the sleeve 55 for axial movement. A flange fulcrum ring 60 is screwed onto the front end of the sleeve 59 at a threaded section 61. While the clutch is disengaged said ring 60 abuts against the front face of the web 54, thereby limiting backward movement of the sleeve 59 under the force of the spring 57 reacting upon the flange 58. During clutch engagement the fulcrum tips 52 of the cam levers 22 bear forwardly upon the back face of the fulcrum ring 60 and thus cooperate with the rollers 26 in thrusting the cam levers 22, their pivot pins 51a and the pressure plate 41 rearwardly for compressing the drive and driven clutch plates 15 and 14 into power transmitting relation.

Each of the three centrifugal weights 23 is arranged as illustrated by the weight shown in Fig. 2. Each is pivoted at a hub portion 62 upon a pivot post 28 which is anchored in the flange 17 of the driving drum 16. The arm 27 of each weight 23 is provided with an axial recess 63 for a journal pin 64 and has a bore 65 intersecting an edge of the recess 63 near its inner end for receiving a locking pin 66 for projection into a circumferential groove 67 in the inner end of its respectively associated journal pin 64. Notches 68 and 69 are cut in the arm 27 transversely and in intersecting relation with the recess or bore 63 for receiving the rollers 25 and 26 which are journalled on the pin 64. In Fig. 1 these rollers 25 and 26 are seen to have sufficient diameter for them to project laterally beyond the outline of the weight arm 27 with which they are associated.

The rollers 25 are aligned for rolling upon the smooth surface of hardened metal disks 70 press fitted within respective holes 71 in the flange 17 whereas the rollers 26 are aligned for respectively rolling along the curved profile 30 of their respectively associated cam levers 22. It will be understood that during outward radial movement of the weight portions W of said weights 23 the rollers 26, while rolling along the profile 30 of their respective cam levers 22, will have a tendency to rotate in one direction while the roller 25 which bears upon its respectively associated disk 70 will tend to rotate in the opposite direction, and it is this tendency of the profiles 30 and the disks 70 to cause opposite rotation of roller surfaces engaging the same that two rollers 25 and 26 have been employed in association with each of the weights 23 instead of a single roller having different peripheral portions respectively engaging the associated disk 70 and cam lever profile 30.

Counter-clockwise rotation of the weights 23, which tends to occur because of rotation of the driving drum 16 with the engine crank shaft 10, because of the greater portion of mass in the weight portions W of said weights 23, is resisted in a calibrated degree by means of helical springs 29 respectively in sleeves 72 press fitted within cylindrical holes 73 in said weight portions. An end wall 74 in each of the sleeves 72 is provided with a hole 75. Pins 76 are placed in telescopic relation with their respective springs 29 and said pins and springs are disposed within their respective sleeves 72. The heads 77 of said pins are of substantially the same diameter as the inner diameter of the sleeves 72 so that said heads are reciprocal axially within said sleeves. The lower ends of said pins, with reference to the one shown in Fig. 2, are projected outwardly through respective openings 75 in the end walls 74 of their sleeves 72, and are held in this position by bifurcated keys 78 of which the bifurcations are slid into the opposite sides of grooves in their respectively associated pins 76. Thus the springs 29 are confined with their opposite ends bearing upon the head 77 of their associated pin 76 and the bottom 74 of their associated sleeve 72. The keys 78 prevent outward movement of the heads 77 axially of their sleeves 72, although said heads 77 may be forced axially inwardly of said sleeves incident to compressing their associated springs 29. Each pin head 77 is provided with a conical recess 80 for receiving the end of a thrust pin 81 having a bearing end 82 journalled upon a bearing pin 83 anchored in the disk-like flange 17 of the clutch driving drum 16.

It will be understood that when the weight portions W tend to be thrown centrifugally outwardly radially of the clutch C during rotation of the driving part of the clutch upon which said weight portions W are carried, when such tendency occurs with sufficient force while said weight portions are in their inward radial positions as illustrated with respect to the weight portion in Fig. 2, the weights 23 will be pivoted about the pivot posts 28 whereby the weight portions W are carried generally toward the thrust pins 81 wherefore the latter react upon the heads 77 of their associated pins 76 to force those heads axially inwardly of their sleeves 72 while compressing the springs 29 as aforesaid. Pursuant to this movement of the heads 77 inwardly of the sleeves 72, the end portions of said pins opposite to the heads 77 will be projected outwardly through their openings in the sleeve end walls 74.

Concurrent and balanced operation of the centrifugal weights 23 is insured by a coordinating ring 84 journalled upon a portion of the clutch driving drum 16 adjacently to the flange 17 at its front end. This ring 84 has three ears 85 equally spaced circumferentially thereabout and projecting radially outwardly therefrom, one of said ears being shown in Fig. 2 in association with the weight 23, the other two ears being identically associated respectively with the other two centrifugal weights. Each ear 85 carries a pin 86 which projects into a notch 87 in a web portion 88 of its associated centrifugal weight 23. As each of the weights 23 pivots about its pivot post 28 it will impart to the associated pin 86 a displacement circumferentially of the clutch driving drum 16, thereby causing rotation of the coordinating ring 84. Since none of the weights 23 can pivot without concurrent rotative movement of the ring 84, said weights must necessarily operate in unison. Pads 89 are provided on the outer periphery of the ring 84 for abutment by the inner sides of the weight portions W when they are in their inner positions radially of the clutch. Said weights W are returned to this inner radial position by the force of the springs 29 acting through their associated pin heads 77, thrust pins 81 and pivot pins 83 and hence the flange 17 when the clutch driving part rotates slowly enough for this force of the springs to overcome the centrifugal force of the weight portions W acting oppositely thereto.

The driven clutch drum 13 has a hub 90 secured thereto by rivets 91 of which one is shown in Fig. 1. Said hub 90 is splined at 92 to the transmission drive shaft 11, and a conical sleeve 93 abuts against the front end of the hub 90 to prevent its forward displacement. A snap ring 94 prevents forward displacement of the conical sleeve 93.

There is riveted to a flange 95 extending about the outer periphery of the driven clutch drum 13, a brake drum 96, there being a plurality of rivets 97 for connecting the parts 95 and 96 together and of which rivets one is shown in Fig. 1. A brake band or the like, (not shown) may be applied to the drum 96 for braking the driven parts of the clutch, which braking action may be utilized in synchronizing meshable parts in the transmission (not shown).

*Operation*

While the clutch is at rest the centrifugal weights 23 will be in their clockwise position, the term clockwise as used herein with reference to the position of the weights 23 will be with reference to the weight illustrated in Fig. 2. Therefore, the rollers 26 will be disposed with respect to the cam levers 22 as illustrated with respect to the cam lever shown in Fig. 1. Consequently the springs 20 will be operable for holding the driving plates 15 separated as shown in Fig. 1 whereas the spring 21 will be operable for holding the spring-stop rings 48 and 49 and hence the clutch pressure plates 41 and 39 axially apart so that the drive and driven plates 15 and 14 of the clutch will be separated and the clutch disengaged. At this time, referring to Fig. 2, the weight portions W will be limited in their inner movement by abutment with the pads 89 therefor upon the weight coordinating ring 84. It will be further noted in Fig. 2 that while the weight portions W abut their pads 89 the axes of the thrust pins 81 and the pins 76 in the weight portion sleeves 72 intersect at an angle of slightly less than 180° facing generally radially inwardly of the clutch C. This off-center condition of the pins 81 and 76 assures that the component of centrifugal force generated by the weight portions W and applied by the pin heads 77 to the ends of their respective pins 81 will always tend to cause said pins 81 to deviate slightly counterclockwise about their pivot pins 83 during clutch engagement. The springs 29 are sufficiently strong to maintain the weights 23 in their clockwise position at engine idling speeds for the clutch driving parts.

Engagement of the clutch is brought about simply by increasing the speed of the clutch driving parts and this is done in the event of starting an automotive vehicle from rest by simply pressing upon the accelerator pedal whereby the speed of the engine is increased. Upon this increase in speed of the engine and the clutch driving parts the weights W will be caused to rotate counterclockwise upon their pivot posts 28, causing their rollers 25 to roll across the face of the force reaction disks 70 whereby forward displacement, axially of the clutch C, of the weight arms 27 and hence of the clutch-engaging rollers 26 is prevented. Therefore, as the clutch-engaging rollers 26 move downwardly in a plane directed normally to the clutch axis, said rollers will roll freely along the curved profiles 30 of the cam levers 22, causing clockwise rotation of these levers, as the lever 22 is viewed in Fig. 1. This clockwise rotation of the levers 22 about their pivot pins 51a causes their fulcrum ends 52 to abut against the fulcrum ring 60. Forward displacement, to the left as viewed in Fig. 1, of the fulcrum ring 60 is prevented during clutch engagement by the strong helical spring 57 which reacts between the axially fixed web 54 of the driving drum 16 and the flange 58 upon the forward end of the axially reciprocal sleeve 59. Since, therefore, the fulcrum ring 60 and the fulcrum ends 52 of the cam levers 22 cannot move forwardly, backward movement of the upper ends of the levers 22, caused by the radially inward movement of the clutch-engaging rollers 26, will result in backward displacement of the pivot pins 51a of said levers 22 and hence of the forward pressure plate 41.

During the initial backward movement of the pressure plate 41 it will first cause its back face 43 to frictionally engage the front face of the front driven plate 14 wherefore this plate is moved axially rearwardly against the driving plate 15 adjacently thereto. This latter plate is held out of engagement with the middle driven plate 14 by the springs 20 although force is transmitted through said springs 20 to the rearmost driving plate 15 which is thus forced rearwardly for compressing the rearmost driven plate 14 therebetween and the fixed pressure plate 39. Thus during initial clutch engagement while the driven drum 13 normally resists rotation because of its connection through the shaft 11 and the transmission (not shown) with a load such as the traction wheels of the vehicle, and while the driving drum 16 of the clutch is rotating at relatively high speed, the driving plates 15 are held out of engagement with the center driven plate 14 but cooperate with the pressure plates 41 and 39 in frictionally engaging the front and rear driven plates 14. This minimization of frictional area established between the clutch plates correspondingly decreases the initial clutch capacity and any tendency thereof to suddenly grab and jerk will therefore be correspondingly decreased. During the initial part of clutch engagement, after the front and back plates 14 are being slidingly engaged between the plates 15 and the pressure plates 41 and 39, the inertia weights 23 will be rotated far enough to cause the cam arms 22 to press the pressure plate 41 far enough rearwardly that it is operable through the forward driven plate 14 for pressing the forward driving plate 15 toward the back driving plate 15 incident to compressing the springs 20. When this occurs the plates 15 will frictionally engage the center driven plate 14 wherefore each of the plates 14 and 15 will be in sliding frictional engagement with their associated relatively rotatable plates for bringing the driving and driven parts of the clutch to a state of synchronism.

The helical spring 57 is of sufficient strength for holding the fulcrum ring 60 in the rearward position shown while the rollers 26 act upon the cam levers 22 with a force causing the pressure plate 41 to exert sufficient force between the plates 14 and 15 to create the rated load capacity for the clutch. However, after this amount of force has been applied to the cam levers 22, the rollers 26 will have encountered a more advanced portion of the cam profile 30 which has less pitch and are therefore effective under the influence of the centrifugal force created by the weights 23 to impart additional rotation to the cam levers 22, and, since at this time the frictional plates 14 and 15 and the pressure plate 41 will have been stacked rigidly against the fixed pressure plate 39, the pivot pins 51a of said levers can move no farther rearwardly wherefore the tips 52 of said levers will be displaced forwardly with a corresponding forwardly displacement thereby of the fulcrum ring 60, the sleeve 59 and the flange 58 upon said sleeve pursuant to compressing the spring 57. The contour of the profiles 30 on the cam levers 22 is so designed that during closing operation of the clutch when the plates 14 and 15 are new and comparatively thick, this forward displacement of the fulcrum ring 60 will be relatively great. But as the plates 14 and 15 erode away at their friction surfaces while in service, said plates become thinner so that during the pivotal movement of the cam levers 22 during clutch engagement the pivot pins 51a will be adapted to approach nearer to the fixed pressure plate 39 whereby the forward displacement of the cam lever tips 52 will be less, the forward displacement of the fulcrum ring 60 also being less as is the compression of the spring 57. This is of no consequence so far as the service of the clutch is concerned, however, because the plates 14 and 15 will be pressed together tightly enough to effect the rated capacity of the clutch so long as there is applied to the levers 22 by the rollers 26 a backward force sufficient to cause any forward displacement of the fulcrum ring 60 against the force of the spring 57. It follows, therefore, that the displaceable fulcrum ring 60 together with the spring 57 which opposes displacement of said ring constitute an automatically adjustable fulcrum structure which causes the engaging and operating characteristics of the clutch to remain substantially unchanged despite wear in the friction plates 14 and 15.

After the clutch has slowed down below a predetermined minimum speed which is jointly controlled by the springs 29 in the weight portions W which act in opposition to the centrifugal force upon these weight portions, said springs will cause the weights 23 to pivot clockwise, with reference to the weight shown in Fig. 2, for withdrawing the rollers 26 radially outwardly along the cam profiles 30, permitting the spring 57 to replace the fulcrum ring 60 to the position shown in Fig. 1 and also to permit the spring 21 to move the spring-stop ring 48 forwardly together with the pressure plate 41 with which it engages. Thus the force of the pressure plate 41 is removed from the stack of plates so that they become loosely associated in non-power transmitting relation. The springs 20, when the pressure plate 41 is retracted forwardly, once more become effective for separating the driving plates 15 from the intermediate plate 14 so that all of the parts reassume the positions shown in Figs. 1 and 2.

Figure 3:
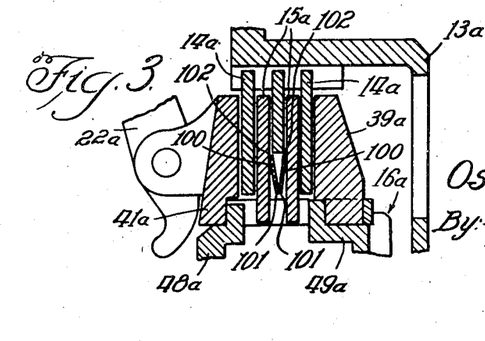

In that form of the invention shown in Figs. 3 and 4 the same parts are shown as in the first embodiment, with the exception of a pair of annular cupped spring rings 100. Therefore, as an expedient in the disclosure of this modified form, the parts shown in Fig. 3 that correspond to the parts shown in the first embodiment are identified by the same respective reference characters with the letter "a" added. The inner diameter of the rings 100 is great enough to enable them to clear the outer periphery of the driving clutch drum 16a so these rings can be assembled back to back in stacked relation with and between the driving clutch plates 15a. Inner edge portions 101 of said rings abut together as shown in Fig. 3, and the axial inclination of the annular bodies of said rings is sufficient that their outer edges 102, when the clutch is disengaged, are displaced axially from the abutting inner edges 101 to maintain the driving plates 15a spread from frictional engagement with the intermediate driven plate 14a. These annular cupped spring members 100 serve the same purpose as the several helical spring members 20 shown in Fig. 1. When the pressure plate 41a is moved rearwardly for engaging the clutch the members 100 will transfer pressure from the forward driving plate 15a to the rear driving plate 15a for causing the rear driven plate 14a to be frictionally engaged between the rear plate 15a and the fixed pressure plate 39a without the intermediate driven plate 14a being frictionally engaged. Upon sufficient increase in the force applied to the pressure plate 41a from the centrifugal weights, the annular springs 100 will be deformed, they being flattened out somewhat, to permit frictional engagement of the driving plates 15a with the middle plate 14a.

Figure 5:
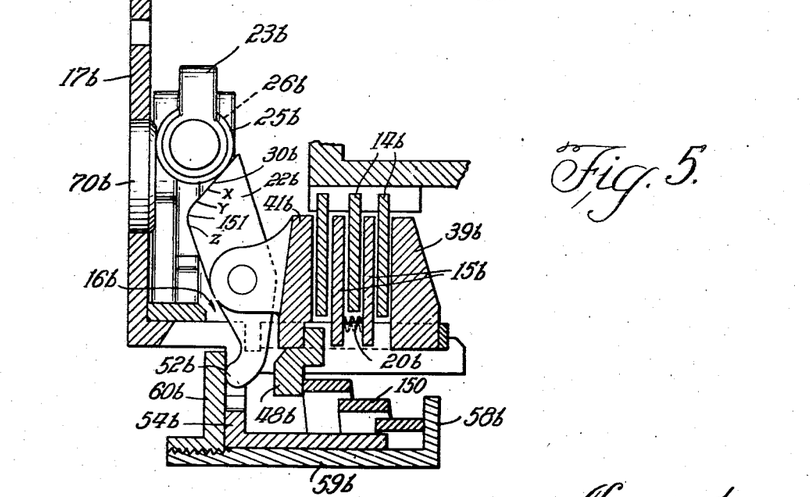
Fig. 5 is a fragmentary view taken similarly to Fig. 1 through a third embodiment of the invention, showing the parts in the positions occupied when the clutch is disengaged.

The parts of the modification shown in Figs. 5 and 6, with the exception of a spiral conical spring 150, correspond respectively to the parts already described with reference to Figs. 1 and 2, wherefore to expedite this description, these corresponding parts will simply be designated with the same respective reference characters with the letter "b" added, without further description.

In this third embodiment the spring 150 supplants the two springs 21 and 57 of the first embodiment, it being noted that the right end of said spring 150 reacts against the stopping means formed by the flange 58b upon the right end of the sleeve 59b whereas the left end of said spring reacts against the abutment means 48b projecting radially inwardly from the pressure plate 41b. Thus in reacting against the abutment means 48b the spring 150 takes the place of the spring 21 for holding the pressure plate 41b in its retracted position and in reacting against the flange 58b takes the place of the spring 57 for normally holding the fulcrum member 60b against the stop means 54b.

The tendency of the pressure plate 41b to move to the left under the influence of the force received from the spring 150 is opposed by the cam levers 22b and by the rollers 25b and 26b of which the former bear against their respective force reaction discs 70b and the latter against their respective cam profile sections 30b of the levers 22b. The pads (not shown) corresponding to the pads 89 on the equalizer ring 84 in Fig. 2 limit pivotal movement of the inertia weights 23b so that the rollers 25 and 26 can move radially outwardly of the clutch no farther than is illustrated by those rollers illustrated in Fig. 5. Consequently the spring 150 is held under tension while causing the levers 22b to react against the fulcrum member 60b and the rollers 26b during the initial stages of clutch engagement, whereby the speed necessary of the clutch driving members for initially pivoting the weights and initially moving the rollers 25 and 26 radially inwardly to cause an initial advancement of the pressure plate 41b for imposing initial clutch closing pressure upon the drive and driven disks 14b and 15b is comparatively great. Normally the spring 150 when compressed to the degree illustrated in Fig. 5, in a typical instance in a clutch designed for automotive use, will exert 400 pounds to the right on the flange 58b and to the left on the abutment means 48b. This will result in the profile 30b of the cam levers 22b exerting sufficient pressure upon the rollers 26b that a rotational speed of the driving members 15b in the neighborhood of 1,000 R. P. M. will be necessary before the weights 23b will be effective for advancing the roller means comprising the rollers 25b and 26b radially inwardly of the clutch and along their respective cam profiles 30b far enough to effect such initial advancement of the pressure plate 41b for causing the clutch plates 14b and 15b to be compressed together with enough force to result in any substantial frictional drag to occur therebetween for the transmission of power. By the time a speed such as 1,000 R. P. M. has been reached by the driving parts of the clutch the rollers 26b will have been advanced to a point such as X upon the cam profiles 30b. A rotational speed of the driving parts of say 1,200 R. P. M. is necessary to cause the rollers 26b to be advanced to the points Y on the cam profiles 30b, and while the rollers 26b are operating any place within the cam profile zones between the points X and Y the pressure plate 41b will be in what is considered as its initial stages of advancement for applying sufficient pressure in compressing the drive and driven plates that the driven plates, under normal conditions, will be brought to the speed of the driving plates. Additional speed of the engine and hence of the clutch driving parts, say to 1,300 R. P. M., will cause the roller means 26b to be advanced to a point Z on the lever peripheries 30b and incident to this further advance of said roller means they will pass about a profile portion 151 of said cam levers and thus occupy an over-throw or over-center position shown in Fig. 6. The lever profile 151—Z therefore amounts to means settable to oppose pivoting of the levers 22b retractively. Pursuant to said additional advancement of the roller means the pressure plate 41b will be advanced very slightly through a final stage, inasmuch as the compressibility of the plates 15b and 14b is slight wherefore the levers 22b will be caused to pivot about their respective pivot pins for moving their inner end portions 52b to the left for displacing the fulcrum member 60b to the left a slight distance, as explained hereinabove in connection with the first described embodiment.

Figure 6:
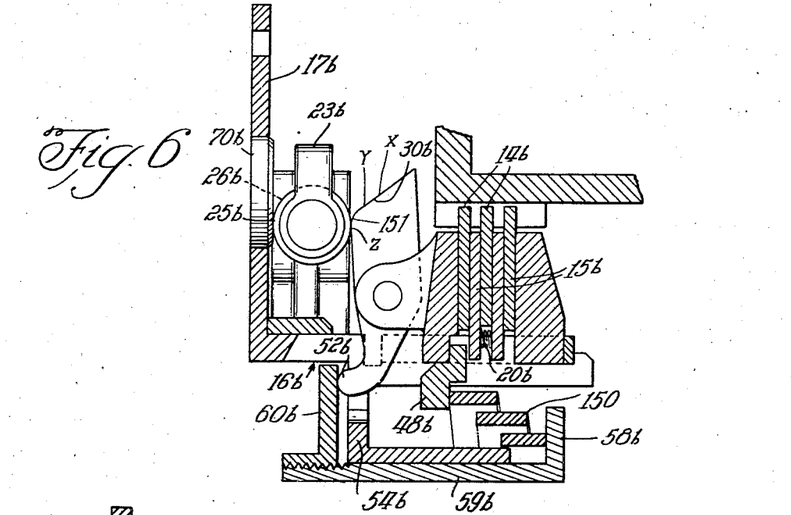
Fig. 6 is a view taken similarly to and of the parts in Fig. 5 but with said parts in the positions respectively occupied when the clutch is engaged.

After the roller means 26b moves to the overthrow position shown in Fig. 6 the reactive force of the spring 150 onto the rollers of such means through the pressure plate and the clutch actuating levers 22b will have no tendency to cause the rollers 26b to move radially outwardly of the clutch in a retractive movement. Consequently the only force available for retracting the roller means 25b—26b are the springs shown at 29 in Fig. 2 in the centrifugal weights 23b and which springs become effective for this purpose only after the clutch driving parts have slowed down rotatively to a speed at which the force of said springs can overcome the inertia force tending to hold the weights 23b pivoted. The weights 23b and the springs 29 (Fig. 2) will be so designed that said springs will be effective for retracting the roller means 25b—26b when the clutch driving parts slow down to about 400 R. P. M. Therefore the clutch shown in Figs. 5 and 6 will have the operating characteristics of causing the clutch to remain disengaged until the driving parts have attained a speed sufficient to allow engine warm-up, and the further desirable characteristic of causing the clutch to remain engaged until the clutch driving parts and hence the engine have slowed down to substantially engine idling speed.

Obviously the springs 20b perform the same function in this third embodiment of clutch in causing a "soft" initial engagement as explained previously with respect to the first embodiment of Figs. 1 and 2. Uniform clutch engagement is further insured by that operating characteristic of the speed responsive control which postpones initial engagement of the drive and driven friction plates until the drive shaft and the engine driving the same have attained a speed of about 1000 R. P. M., at which speed the engine develops sufficient torque that loading the same by gradual closing of the clutch does not materially slow down the engine to reduce the torque developed thereby, whereby clutch "chatter" and load "gallop" is avoided.

While a limited number of embodiments of the invention are herein shown and described, it will be understood that the invention extends to other embodiments, forms, modifications, structures and details falling within the scope and spirit thereof and not sacrificing all of its material advantages.

I claim:

1. In a clutch including a pressure plate axially advanceable to effect engagement of said clutch, spring-stop means, spring means arranged coaxially with said pressure plate and with one end disposed for reaction against a side of said stop means and with its opposite end projecting axially from said stop means in the direction of advancement of the pressure plate, a fulcrum member disposed at the opposite side of said stop means and including a portion extending axially through the spring for reaction against the other end thereof and to thus compress the spring therebetween and said stop means pursuant to axial displacement of the fulcrum member from the stop means oppositely in direction to the axial advancement of the pressure plate, a plurality of levers spaced circumferentially about said spring and extending generally radially with respect thereto, each of said levers having an inner end portion associated with the fulcrum member, an intermediate portion associated with the pressure plate and an outer end portion receivable of actuating force for pivoting the same to cause the lever intermediate portions to impart force to the pressure plate in the direction it is advanceable while the inner end portions impart a reactive force to the fulcrum member in the direction of its aforesaid displacement.

2. In a clutch including relatively rotatable drive and driven annular friction members pressable axially together for frictional engagement to preclude such relative rotation, a hollow force transmitting member disposed coaxially of and within said annular friction members and connected for rotation with one thereof, said hollow member having a plurality of circumferentially spaced openings therein communicating between the interior and exterior thereof, an annular pressure plate arranged coaxially with and about said hollow member and advanceable axially thereof to exert upon said friction members a force pressing them into said frictional engagement, a spring-stop member within said hollow member, a helical spring having one end disposed for compressive reaction against one side of said stop member and with its opposite end projecting axially from said stop member in the direction of advancement of said pressure plate, a fulcrum member at the opposite side of said stop member and including a portion extending axially through said hollow member for compressive reaction against the other end of the spring while compressing it therebetween and said stop member incident to axial displacement of the fulcrum member from the stop member in the direction opposite to that in which the spring projects from the stop member, a plurality of levers pivotally associated with said pressure plate for rotation about respective axes directed generally normal to the pressure plate axis, each of said levers having an inner end portion projecting inwardly of said hollow member through one of its said openings into force transmitting relation with said fulcrum member, and each of said levers having an outer end portion receivable of actuating force for pivoting the same to impart force to the pressure plate in the direction it is advanceable while the inner end portions impart to said fulcrum member a reactive force in the direction of its aforesaid displacement.

3. In a clutch, a rotatable driving drum coaxial with said clutch and having a plurality of circumferentially spaced openings, a plurality of annular drive and driven friction plates arranged coaxially about said drum and of which the drive plates are constrained for rotation with said drum, said plates being axially compressible to establish frictional driving engagement therebetween, an annular pressure plate also arranged coaxially of and about said drum and axially advanceable to compress said plates, a stop member in said drum and including a cylindrical bearing projecting therefrom coaxially with the drum in the direction of said pressure plate advancement, said cylindrical bearing being smaller in diameter than the inner diameter of said drum to form an annular spring chamber between these parts, a helical compression spring disposed coaxially of and within said chamber about said bearing and having one end disposed against one end of said stop member, a fulcrum member at the opposite end of said stop member and including a stop sleeve projecting reciprocally through said cylindrical bearing and having upon its projecting end a spring-stop means for bearing against the opposite end of said spring to cooperate with said stop member in compressing said spring upon displacement of the fulcrum member axially from the stop member in the direction opposite to that in which the spring projects from said stop member, and a plurality of actuating levers having intermediate portions pivotally associated with said pressure plate and advanceable to advance said pressure plate, said levers also having outer end portions and inner end portions projecting inwardly respectively through said drum openings for reacting against said fulcrum member in the axial direction said fulcrum member is displaceable while said outer end portions are manipulated for advancing said intermediate portions.

4. In a clutch, a rotatable drum coaxial with said clutch and having a plurality of circumferentially spaced openings, annular friction members arranged coaxially of and about said drum and compressible axially together to effect engagement of the clutch, an annular pressure plate also arranged coaxially of and about said drum and advanceable axially thereof to compress said friction members, spring abutment means movable axially with said pressure plate and extending radially inwardly of said drum through said openings, a second spring abutment means within said drum and spaced axially thereof from the first abutment means in the direction of said advancement of the pressure plate, and a helical spring disposed coaxially of and within said drum between said abutment means and with its two ends reacting respectively thereon to yieldingly resist said advance of the pressure plate.

5. In a clutch, a rotatable drum coaxial with said clutch and having a plurality of circumferentially spaced openings, sets of annular drive and driven friction members arranged coaxially of and about said drum and of which one set is constrained for rotation with said drum, said sets of members being axially compressible together to effect engagement of the clutch, an annular pressure plate coaxially of and about said drum and advanceable axially thereof to compress said friction members, spring abutment means movable axially with said pressure plate and extending radially inwardly through the drum openings, a second spring abutment means within said drum and spaced from the first abutment means in the direction of advancement of said pressure plate, a helical spring disposed coaxially of and within said drum between said abutment means and with its two ends reacting in opposite axial directions respectively upon said abutment means to yieldingly resist said advance of the pressure plate, a spring stop in said drum, a hollow sleeve-holder coaxial of and within said drum and forming therewith an annular spring chamber containing said spring, said sleeve-holder projecting axially from one end of said stop in the direction of advancement of said pressure plate, a fulcrum member at the opposite end of said stop member and including a stop sleeve axially reciprocally within and projecting through the sleeve-holder and having upon its projecting end a radially outwardly directed spring stop at an end of said spring chamber, a helical compression spring disposed within the spring chamber coaxially of and within the first spring and with its two ends reacting axially oppositely upon said spring stops to yieldingly resist displacement of the fulcrum member axially from the opposite end of the first spring stop, and clutch actuating lever means pivotally associated with said pressure plate and manipulatable to advance the same while reacting upon said fulcrum member in the direction urging it in the direction of its said displacement.

6. In a speed responsive clutch including drive and driven parts frictionally engageable in driving relation by axial displacement of an actuating member therefor, a centrifugal weight member pivotally connected with the driving member for rotation about an axis parallel with but displaced from the rotational axis of said driving member, spring means normally holding said weight at one limit of oscillative pivotal movement about its pivotal axis, adjacent rollers carried on said weight and each being journalled for rotation about an axis substantially intersecting and generally normal to said pivotal axis, said weight being pivotal toward the other limit of oscillative movement in response to a predetermined speed increase of the driving member, one of said rollers being disposed for rolling against said actuating member to effect said axial displacement thereof incident to said pivotal movement of the weight, and means on the opposite side of said weight, axially of the clutch, from said actuating member and upon which the other of said rollers is adapted to roll and react to prevent displacement of the one roller axially of the clutch by the reactive force thereon of the displaced actuating member.

7. In a speed responsive clutch wherein there are rotatable drive and driven members frictionally engageable to effect therebetween a driving relation and a pressure plate axially advanceable in initial stages to effect engaging pressures between said members and in a final stage to effect a greater pressure between said members to prevent relative rotation thereof, a cam displaceable for imparting to said pressure plate a force for advancing the same and having a profile upon which force is appliable to effect such displacement of the cam and plate, a cam follower advanceable along said cam profile to apply said force thereto in an amount constituting a direct function of the follower's advancement, means responsive to an increase in speed of the drive member to advance said follower along said profile and for withdrawing said follower along said profile upon a subsequent decrease in the driving member speed, a spring disposed for imparting to said pressure plate and to said cam, at all times, a force in opposition to the force applied by said follower along said profile and thus increase the speed at which the clutch drive member must rotate for advancing the pressure plate in its initial stages of advancement, and said profile having a dwell for the follower at an advanced position thereon reached by said follower upon advancement of the pressure plate to said final stage to retain said follower in such advanced position at drive member speeds substantially below the speed required of said drive member to cause advancement of the pressure plate in said initial stages.

8. In a speed responsive clutch wherein there are rotatable drive and driven members frictionally engageable to effect therebetween a driving relation and a pressure plate axially advanceable in initial stages to effect engaging pressures between said members and in a final stage to effect a greater pressure between said members to insure against relative rotation thereof, a force reaction member, roller means advanceable between said reaction member and said pressure plate to react against said reaction member while imparting to said plate for advancing the same a force constituting a direct function of the amount of roller means advancement, means responsive to an increase in speed of the drive member to advance said roller means and to retract said roller means upon a subsequent decrease in drive member speed, a spring disposed for imparting to said pressure plate and to said roller means, at all times, a force in opposition to said force imparted to the plate by the roller means to increase the rotational speed necessary of the drive member for advancing the pressure plate in its initial stages of advancement, and said roller means being operable when further advanced to occupy an over-center position between said force reaction member and said pressure plate substantially upon advancement of said plate into said final stage to cause said roller means to remain in such over-center position at drive member speeds substantially below the speed required of said drive member to cause advancement of the pressure plate in said initial stage.

9. In a speed responsive clutch wherein there are rotatable drive and driven members frictionally engageable to effect therebetween a driving relation and a pressure plate axially advanceable in initial stages to effect engaging pressures between said members and in a final stage to effect a greater pressure between said members to insure against relative rotation thereof, spring abutment means associated with said pressure plate and receivable of force transmittable thereby to said pressure plate for axially retracting the same oppositely to the direction in which it is axially advanceable, a spiral spring arranged coaxially with said drive and driven members and with one end disposed for reaction against said abutment means to impart said force thereto and with its other end projecting from said abutment means in the direction of pressure plate advancement, an axially movable sleeve coaxial of and within said spring and having thereon stop means for reacting against said other end of said spring to coact with said abutment means in axially compressing the spring, a second stop means for limiting axial advancement of said stop means and said sleeve under the expansive force of said spring in the direction of pressure plate advancement, fulcrum means on said sleeve, a plurality of levers spaced circumferentially about and disposed generally radially of said sleeve, each of said levers having an inner end portion in force transmitting relation with said fulcrum means, an intermediate portion pivotally associated with said pressure plate and an outer end portion to which force is appliable to advance the intermediate portion together with the pressure plate while the inner end portion reacts against said abutment means, said levers being pivotal under the influence of the force applied to their outer end portions, after the final stages of advance of the pressure plate, to cause their inner end portions to displace said fulcrum means, said sleeve and the first stop means thereon axially oppositely to the advance of the pressure plate, while compressing said spring between said abutment means and said first stop means, force reaction means, roller means advanceable between said reaction means and said outer end portions of the levers to react against said reaction means while imparting said force to said outer end portions in an amount constituting a direct function of the roller means advancement, means responsive to an increase in speed of the drive member to advance said roller means and to retract said roller means upon a subsequent decrease in drive member speed, said spring being compressed between said abutment means and the first stop means when the fulcrum means is against the second stop means whereby said spring is conditioned for imparting to said abutment means and to said pressure plate and levers a force in opposition to the force imparted to the levers by said roller means and to thus increase the rotational speed of the drive member necessary to cause the speed responsive means through said roller means to advance the pressure plate in its initial stages of advancement, and said roller means being operable when further advanced to occupy an over-center position between said force reaction means and said levers, substantially concurrently with completion of said pivotal movement of said levers and displacement of said fulcrum member, to cause said roller means to remain in such over-center position at drive member speeds substantially below the speed required of said drive member to cause advancement of the pressure plate in its said initial stages.

10. In a clutch, a rotatable drum having circumferentially spaced openings, annular drive and driven members arranged coaxially of and about said drum and of which one is constrained for rotation with the drum, said members being axially compressible together to effect engagement of the clutch, an annular pressure plate advanceable axially of the drum to compress said members, spring abutment means movable axially with the pressure plate and extending inwardly of the drum through certain of said openings, spring stop means in the drum, a hollow sleeve-holder coaxial of and within said drum and forming therewith an annular spring chamber, said sleeve-holder projecting axially from one end of said stop means in the direction of advancement of said pressure plate, a fulcrum member at the opposite end of the stop means, a sleeve associated with said fulcrum member for axial movement therewith and being axially reciprocably within and projecting through the sleeve-holder and having upon a portion thereof, projected axially beyond said sleeve-holder, a second stop means, an axially compressed spiral spring coaxial with and within said spring chamber and with its ends thrusting respectively against said spring abutment means and the second spring stop means to resist advancement of the pressure plate, means limiting axial displacement of said abutment means oppositely to the axial advancement of the pressure plate to preserve the compressed condition of the spring while it acts through the second stop means and said sleeve to resist axial displacement of the fulcrum member from its end of the first stop means, and clutch actuating lever means pivotally associated with said plate and pivotal to advance the same while reacting upon said fulcrum member in the direction for urging said axial displacement thereof.

11. The combination set forth in claim 10, wherein the pressure plate is initially advanceable to effect engaging pressures between the drive and driven members and is finally advanceable to effect a greater pressure between said members, force reaction means adjacently to said levers but spaced axially of the clutch therefrom, roller means advanceable between said reaction means and said levers to cause said pivotal movement thereof, means responsive to the speed of the drive member to advance said roller means and to retract the same upon subsequent reduction in driving member speed, said initial advancement of the pressure plate being against the force of the compressed spring to increase the drive member speed required to cause the speed responsive means to advance the roller means into an initial range corresponding to the initial advancement of said plate, and said roller means being operable, when further advanced, to occupy an overcenter position between the force reaction means and said levers upon pivotal movement of the levers thereby sufficiently to have finally advanced the pressure plate and to have exerted sufficient reactive force on the fulcrum member to cause a small amount of said axial displacement thereof, and said over-center position being such that the retractive force of the speed responsive means on the roller means is sufficient to retract said roller means to cause opening of the clutch only after the drive member has decelerated to a rotative speed substantially below the speed necessary to advance said roller means into said initial range.

12. In a clutch including rotatable drive and driven members and a pressure plate axially advanceable to effect engagement of said clutch, the combination of displaceable lever fulcrum means, a common means elastically resisting said advancement of the pressure plate and said displacement of said fulcrum means, a plurality of clutch actuating levers pivotal in one direction, while reacting against said fulcrum means, to apply a force to said pressure plate for producing advancement of the same, means responsive to an increase in speed of the drive member cooperable with said common elastically resisting means for incurring pivoting of said levers in said direction and controlling the force of said common elastically resisting means in pivoting said levers in the opposite direction upon a subsequent decrease in the driving member speed, said common elastic resisting means having sufficient resistance to preclude displacement of the fulcrum means under the reactive force imposed thereon by the levers in producing said advancement of the pressure plate, and said lever pivoting means being operable, following said advancement of the pressure plate, to further pivot said levers in said one direction for displacing said fulcrum means in opposition to said common elastic resistance means while reacting against the pressure plate, and means settable pursuant to said further pivot of the levers to oppose pivoting of the levers in the other direction.

13. In a speed responsive clutch including a pressure plate axially advanceable to an extent for effecting complete engagement of the clutch, a fulcrum member resiliently displaceable when subjected to a minimum force, a lever having a first translatory pivot portion in rockable force transmitting association with said pressure plate, said lever having a second pivot portion spaced from the first pivot portion and reactable against said fulcrum member, centrifugal means operable to apply actuating force to a third portion of the lever spaced oppositely from the first portion with respect to the second portion, said lever being pivotable about the second pivot portion when an initial actuating force is applied to the third portion pursuant to advancing the first pivot portion together with the pressure plate substantially to said extent for complete clutch engagement, and being pivotable about the first portion under the influence of an increment of actuating force while imposing a force on said fulcrum member through the second portion in excess of said minimum force and thereby incurring displacement of said fulcrum member.

14. In a speed responsive clutch, a driving structure, a driven structure, annular friction elements respectively constrained for rotation with said structures, a pressure plate advanceable axially of said elements for pressing them into frictional driving relation, centrifugal weight means mounted on the driving structure and having portions movable between a slow speed position and a fast speed position according to the speed of said structure, a plurality of levers extending radially of said structures and constrained for advancement and retraction with said pressure plate and mounted at intermediate portions thereof for pivotal movement about respective axes extending transversely of and spaced radially from the axes of said driving and driven structures, said levers also having inner end portions disposed radially inwardly of the clutch and outer end portions disposed radially outwardly thereof, a spring reaction member mounted within the clutch radially inwardly of said levers for endwise movement axially of said structures, said member having a fulcrum end portion reactable upon by the inner end portions of said levers in the direction urging said member in the axial direction of retraction of the pressure plate, said member having spring reaction means upon its opposite end portion, stop means limiting axial advancement of said member in the opposite direction, a spring embracing said member between its end portions and reacting axially between said spring reaction means and said plate to urge said member against the stop means while urging the plate retractively, said levers being urged to pivot by the retractively urged plate while their inner end portions react against said fulcrum end portion of said member, and the outer end portions of said pivotally urged levers being disposed for reaction against said portions of the centrifugal weight means for urging the same to the slow speed position.

15. In a clutch including rotatable drive and driven members and a pressure plate axially advanceable to effect engagement of the clutch, the combination of a displaceable lever fulcrum means, a common elastic means initially resisting said advancement of the pressure plate and said displacement of said fulcrum means, a plurality of clutch actuating levers pivotable in one direction, while reacting against said fulcrum means, to apply a force to said pressure plate for producing advancement of the same while said elastic means tends to pivot said levers in the opposite direction, means responsive to an increase in speed of the drive member for pivoting said levers in said direction, said common elastic means having sufficient resistance to preclude displacement of the fulcrum means under the reactive force imposed thereon by the levers in producing said advancement of the pressure plate, and said lever pivoting means being operable, following said advancement of the pressure plate, to further pivot said levers in said one direction for displacing said fulcrum means in opposition to said common elastic means while reacting against the pressure plate, and means settable pursuant to said further pivot of the levers to oppose said common elastic means in the pivoting of the levers in the other direction.

16. In a clutch including rotatable drive and driven members and a pressure plate axially advanceable to effect engagement of said clutch, the combination of displaceable lever fulcrum means, a common means elastically resisting said advancement of the pressure plate and said displacement of said fulcrum means, a plurality of clutch actuating levers pivotable in one direction while reacting against said fulcrum means to apply a force to said pressure plate for producing advancement of same, each of said levers having a cam profile portion upon which force is receivable for pivoting the same, speed responsive means responsive to the speed of said drive member and including rollers respectively rollable upon said cam profiles pursuant to pivoting the levers, said common elastic resisting means having sufficient resistance to preclude displacement of the fulcrum means under the reactive force imposed thereon by the pivoting levers in producing said advancement of the pressure plate, said speed responsive lever pivoting means being operable, following said advancement of the pressure plate, to further pivot said levers in said one direction incident to the advancement of the rollers into advanced position upon said profiles, and for displacing said fulcrum means in opposition to said common elastic resistance means while the levers react against the pressure plate, and said cam profiles being of a contour to increase the mechanical advantage of the rollers in the application of pivoting force thereon as said rollers approach their advanced positions on their associated profiles.

17. In a clutch, driving and driven elements, a pressure plate advanceable to establish a power transmitting relation between said elements and retractible to terminate said relation, levers pivotally mounted on said pressure plate and through which a force is appliable for advancing said plate, an advanceable reaction means for said levers, speed responsive means capable of developing a force in accordance with the speed of said driving element, means for imposing a component of said speed responsive force on said levers for advancing said pressure plate while the levers react on said reaction means in the direction to advance the same, a common elastic means yieldably resisting advancement of said pressure plate and of said reaction means, and said force imposing means being operable to increase the magnitude of said force component with respect to the developed force of the speed responsive means pursuant to advancement of the pressure plate.

18. In a clutch, driving and driven elements, a pressure plate advanceable to establish a power transmitting relation between said elements and retractible to terminate said relation, levers having pivoted portions pivotally mounted on said plate for advancement and retraction therewith and having force-receiving portions receivable of a force component for advancing said pivoted lever portions and said pressure plate through a clutch-engaging range of movement, an advanceable reaction means reacted on by other portions of said levers and thus urged advanced by said force component during said advancement of said pressure plate and the pivoted lever portions, speed responsive means capable of developing a force in accordance with the speed of said driving element, means for imposing a component of said force on said force-receiving lever portions for advancing the pressure plate as aforesaid, a common elastic means yieldably resisting advancement of said pressure plate and said reaction means, said force imposing means being operable to increase the magnitude of said force component relatively to that of the developed force as the developed force increases, and said common elastic means accommodating pivoting of said levers and concomitant advancement of said reaction means pursuant to continued increase of the force component following advancement of the pressure plate through said clutch-engaging range.

OSCAR H. BANKER.

REFERENCES CITED

The following references are of record in the file of this patent:

UNITED STATES PATENTS

| Number | Name | Date |
| --- | --- | --- |
| 653,816 | Miller | July 17, 1900 |
| 745,559 | Beard | Dec. 1, 1903 |
| 1,861,830 | Banker | June 7, 1932 |
| 1,862,951 | Bignond | June 14, 1932 |
| 1,865,772 | Lyman | July 5, 1932 |
| 1,953,187 | Nakashian | Apr. 3, 1934 |
| 1,973,199 | Conway | Sept. 11, 1934 |
| 1,993,124 | Tower | Mar. 5, 1935 |
| 2,003,323 | Vail | June 4, 1935 |
| 2,090,265 | Padgett | Aug. 17, 1937 |
| 2,108,969 | Lewis | Feb. 22, 1938 |
| 2,167,590 | Slaugenhop | July 25, 1939 |
| 2,217,357 | Coe | Oct. 8, 1940 |
| 2,248,377 | Nutt | July 8, 1941 |
| 2,280,356 | Spase et al. | Apr. 21, 1942 |
| 2,287,630 | Miller | June 23, 1942 |

FOREIGN PATENTS

| Number | Country | Date |
| --- | --- | --- |
| 17,162 | Great Britain | Sept. 26, 1892 |
| 42,181 | France | Mar. 7, 1933 |
| | (1st addition to No. 695,478) | |